April 18, 1933. P. W. LEFFLAND 1,904,287
SUPPORT FOR PARASITIC GROWTHS
Filed Dec. 26, 1930
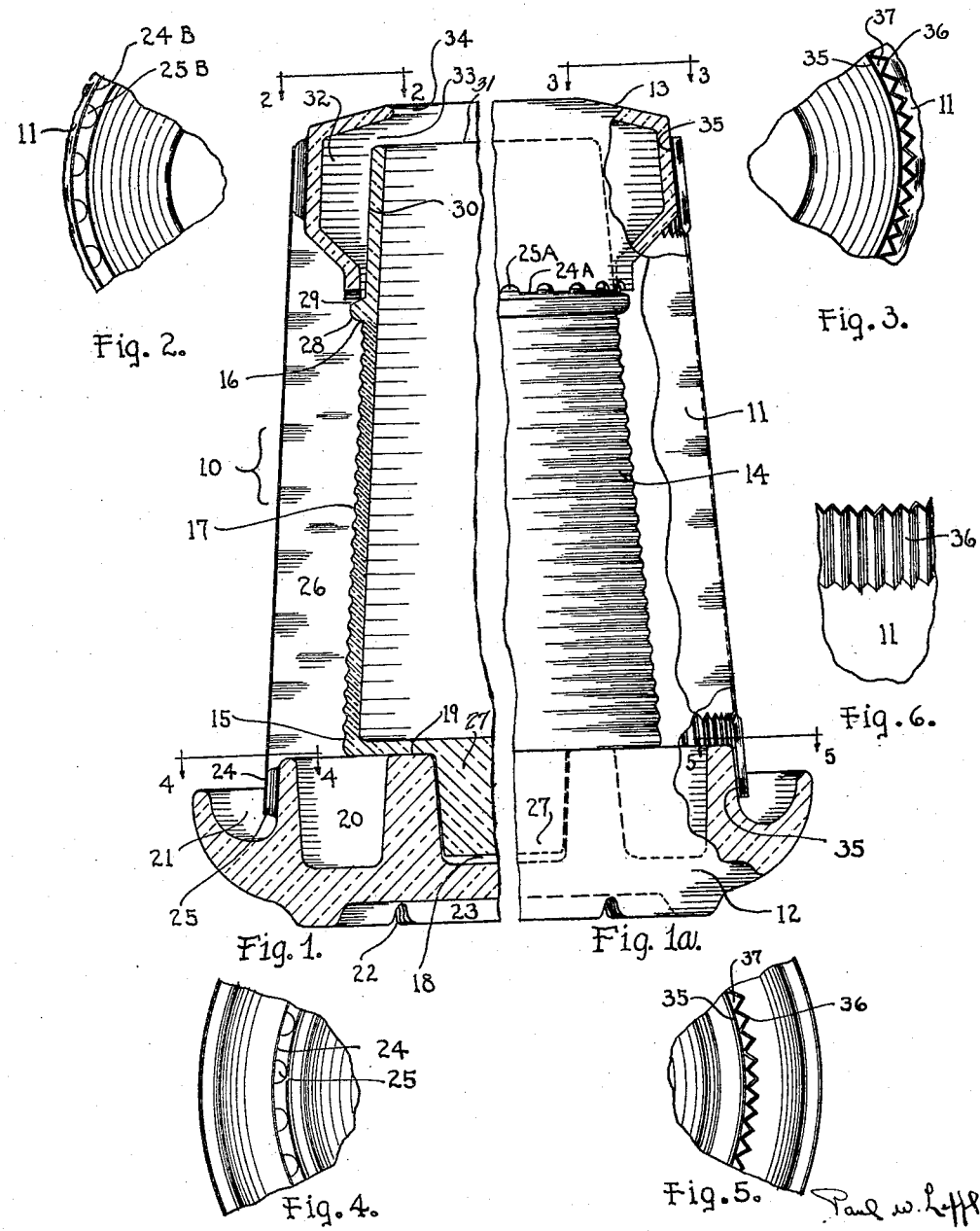

Patented Apr. 18, 1933

1,904,287

UNITED STATES PATENT OFFICE

PAUL W. LEFFLAND, OF ARLINGTON, TEXAS

SUPPORT FOR PARASITIC GROWTHS

Application filed December 26, 1930. Serial No. 504,837.

This invention relates to a novel flower vase designed and primarily intended for use in the capacity of a support for parasitic growths or plants.

It has been proposed that a novel flower vase be made in one piece with its top and bottom portions enameled, glazed or otherwise treated and with its center portion roughened and porous to receive a pasting of seeds or a composition consisting in part of seeds. It has further been proposed that an annular trough be constructed integrally therewith and surrounding the bottom while the top of the vase is flared out above the porous portion and a transparent forcing jacket fitted against this flared out portion and received by the trough forming a moist chamber about the porous area when the area has been planted designed to germinate. It has further been proposed that this vase have a circumferential series of irrigating openings immediately above the growth area, it being the purpose that all water filled into the vase above this water line irrigate thru the openings to the exterior growth area, however, leaving the water line after irrigating, the height of the openings or approximately level with the top of the growth area.

The following may be noted as faults in the present vase construction which I propose to improve.

The present vase as made in one piece is difficult to handle when pasting seeds or compositions consisting in part of seeds, upon the seeding area, and further, the growth portion growing on the surface designed for it will necessarily follow the light and must be turned in order that it might grow artistically and with the vase made in one piece it is, of course, necessary that the entire vase be turned.

Further, the collection in the annular trough of surplus moisture not used by the growth portion requires emptying and in doing this it is also required that the base proper be emptied, altho it may not be the desire to do so, and further, in emptying the trough, water from the interior of the vase proper pours thru the irrigating openings at the lower side wetting the growth in proximity to these openings. This has a tendency to cause the growth to pull away from the vase at this point due to the excessive washing of the roots and the added weight of the growth.

Further, on a present vase an annular trough contacts the growth portion at the bottom and is projected out from the base to catch surplus moisture which is not utilized by the growth portion above and to receive the lower end of a transparent forcing jacket. The drainage thrown off in this trough is usually discolored and unsightly in connection with a vase intended to be ornamental and should not be prominently located, and further, this drainage being caught in the same trough which receives the transparent forcing jacket naturally discolors the bottom of the cover, requiring that it be cleaned at the bottom each time after it has been used.

Further, in using a present vase it is necessary to continually add water in order to maintain the water line at least the height of the growth, for the irrigating openings and the top of the growth area are approximately in alignment and consequently the highest water line is at this point. This water line soon falls below the growth height inasmuch as the growth must continually receive moisture thru the pores of the vase for livelihood.

An object of my invention is to make in three pieces, and including a transparent forcing jacket, a novelty flower vase designed with a center part both porous and roughened in order to receive a pasting of seeds, or a composition consisting in part of seeds, and with a bottom or base piece and a top piece of glazed pottery, china or any suitable ornamental material, and so constructed that any surplus moisture from the center part will be received by an inner trough of the bottom or base piece either by dripping or by capillary attraction to the same while the drainage is practically concealed by the construction and combination of the parts. An outer trough of the bottom piece is designed to receive only the bottom part of a forcing jacket, together with the slight moisture which might collect on the interior of the forcing jacket, should it trickle down the side, which, however, is not discolored or unsightly.

A further object of my invention is to provide in the center of the bottom piece a round tapered hole to receive a matched tapered lug on the lower portion of the center porous part in order that this center porous part may be turned on the base piece, without, however, moving the entire vase.

A further object of my invention is to provide a center part with its greater exterior porous and corrugated as a seeding surface, its bottom including at its center an integral downwardly projecting tapered lug, and having an integral portion above the seeding area sufficiently large that it may be conveniently grasped when seeding the center part, and further, sufficiently high relatively, to devise a water line a reasonable height above the growth line, or rather the top of the growth line, and further, to provide a circumferential flange immediately above the top of the growth line to support a separate cap piece, forming in combination with a circumferential series of slots in the cap piece at its bearing on the flange, irrigating openings, made so by pouring the center piece full of water, to overflow into the surrounding interior of the cap or indirect irrigating space, and by virtue of this construction, having irrigating openings immediately above the growth line at its top, and having a water line appreciably above the top of said growth, minimizing the danger of the water line falling below the top of the growth which would of course be disastrous to the growth.

A further object of my invention is to glaze the exterior top and bottom portions of the center part for the convenience of anyone pasting seeds or compositions consisting in part of seeds upon the seeding area of same, it being easier to wipe off such seeds or other substances coming in contact with these surfaces if the surfaces are glazed and further it being impossible for these top and bottom surfaces to become discolored by action of the process of the conjuncting growth when such surfaces are glazed.

A further object of my invention is to make a cap piece with an opening in its top smaller relatively than the top of the center part over which it fits, in order that water poured into the center piece will first fill same and not pour over the side of the center into the cap or indirect irrigating space, causing irregular irrigation or the washing off of seeds on the growth area by the force of this direct pouring.

A further object of my invention is that in combination the center part and the cap piece shall form an intervening indirect irrigating space for the said overflow from the center part, and further, that the opening in the top of the cap shall be sufficiently large that it may be used in setting the center part upon when the vase may be disassembled for the purpose of cleaning the bottom or base piece of the vase, the tapered lug, of course, being received by the top opening.

A further object of my invention is to ventilate, by indirect ventilation, a chamber formed by a transparent forcing jacket contacting the vase top and bottom of same and set out from the seeding area of the center part which it surrounds, the said indirect ventilation being at the said top and bottom contacts. Experiments prove that the chamber need not be air tight and so long as the chamber is not too greatly ventilated the growth on the seeding area may be satisfactorily forced to grow and will grow evenly provided of course that no direct lateral drafts are allowed upon the seeded area. Ventilation of the chamber is primarily to minimize condensation on the interior of the jacket and to hasten the clearing up of same in order that the growth portion may be visible to the eye during the time that the jacket is being used.

The nature and the advantages of the invention will be better understood when the following detailed description is read in connection with the accompanying drawing, the invention residing in the construction, combination and arrangement of parts as claimed.

In the drawing forming a part of this application, like numerals of reference indicate similar parts in the several views, and therein:

Figure 1 is a view in section and Figure 1—A is a view in elevation of a vase and the associated jacket constructed in accordance with the present invention.

Figure 2 is a ventilation part top plan taken at 2—2 showing a method of indirect ventilation at the jacket contact with the cap while Figure 3 taken at 3—3 is another method of indirect ventilation at the jacket contact with the cap.

Figure 4 is a part plan taken at 4—4 showing a method of indirect ventilation at the jacket contact with the bottom piece while Figure 5 taken at 5—5 is another method of indirect ventilation at the jacket contact with the bottom piece.

Figure 6 is an enlarged detail of the crimping of the top and bottom of a transparent forcing jacket.

Referring to the drawing in detail, 10 indicates generally a vase adapted to be utilized as a support for parasitic growth or plants and also designed to maintain the water contained therein at a low temperature. This vase is made in three pieces with the forcing jacket 11 being the fourth piece. The bottom piece or base 12 and the cap piece 13 may be made of any suitable ornamental waterproof material while the center part 14 is made of pottery properly porous with its bottom and its top immediately below and above the growth support area to be glazed waterproof as at 15 and 16. The area between these points as at 17 is of course sufficiently porous and corrugated to maintain any of the types of adhesive seeds or compositions consisting in part of seeds and to accomplish the growth of same with the conjuncting forcing jacket which is now well known. The seeds or the composition consisting in part of seeds is applied to the area 17 and the forcing jacket 11 is applied and the interior of the vase is filled with water to the top as at 31 and allowed to grow or if the composition or seeds are applied and allowed to dry the application on 17 is irrigated a few times thru irrigators above the growth area in order to put the seeds or composition in a wet state for germination. The forcing jacket is removed after about seven days or after the seeded area has been sufficiently forced or started. This process and the results obtained are now well known.

Referring more specifically to 12 which I call the bottom piece or base of the vase, the opening or recess 18 is at the center and is tapered while the annular surface 19 about it is a bearing surface for the center part. 20 is an annular inner drain designed to receive the surplus moisture thrown off by the growth on the center part. 21 is an outer trough designed to receive the forcing jacket 11. 22 are ventilating means for the space 23. The bearing surface 24 for the plain forcing jacket on the inner side of the outer trough is broken by a circumferential series of flutes 25 in order to ventilate the space 26 indirectly or from the bottom. This is shown in Figures 1, 1—A and 4.

Referring more specifically to 14 which I call the center part of the vase the lug or integral projection 27 is tapered and fits into the opening 18 designed to receive it and is centrally a part of the center part at its bottom serving as a pivot for manually revolving the centerpart upon the bottom piece. The major side of the center part is of course porous and corrugated or roughened as at 17 and the entire part is preferably of pottery and is preferably about $\tfrac{3}{16}''$ or more thick. Immediately above the growth portion 17 I have an annular projecting flange 28 preferably beveled at its top as at 29 and above this as shown is the upper part 30 of the centerpiece which is designed as a grasping means and as a retainer to hold the water line of the center part appreciably above the growth portion as at 31. The exterior of this center part is glazed from the point 16 up to the top and from the point 15 down, which includes the entire bottom and the projecting lug upon the bottom. Upper portion 30 is preferably integral with flange 28, porous portion 17 and projection 27.

Referring more specifically to 13 which I call the cap piece 24A indicates a bearing surface which is broken by a circumferential series of flutes 25A which in conjunction with the surface 29 and the surface of 30 form irrigating openings for all water received in the indirect irrigating space 32 which is defined by the cap piece in combination with the center part. The space 33 is preferably small to prohibit too great an overflow from the center piece into the space 32. The top opening in the cap as at 34 is sufficiently small to prohibit the pouring of water directly into the space 32. The surface 24B and the flutes 25B are substantially as specified for 24 and 25 and serve the same purpose of allowing indirect ventilation into the space 26 from the top. This is shown in detail in Figure 2.

Referring more specifically to Figures 3 and 5 the surfaces of the cap piece and the bottom or base piece as at 35 are smooth to receive the top and bottom ends of the transparent forcing jacket 11. Both the entire top and bottom ends of the forcing jacket are crimped as at 36 and to a length appreciably greater than the amount of bearing against the surfaces 35 in order that the space 26 might be indirectly ventilated thru the space defined between the crimped cover and the surface 35 as at 37. Figure 6 shows an enlarged detail of this crimped jacket. It is of course understood that this is an alternate method of indirectly ventilating the space 26.

While it is believed that from the foregoing description, nature and advantages of the invention will be readily apparent, I desire to have it understood that I do not limit myself to what is herein shown and described and that such changes may be resorted to when desired as fall within the scope of what is claimed.

Having thus described the invention, I claim:

1. A flower vase comprising a waterproof base provided with a recess, a center part formed of porous material provided with an integral projection to fit said recess and with a corrugated outer surface, and an integral upper glazed portion, the lower part of said glazed portion being provided with an annular outwardly projecting flange.

2. A flower vase comprising a waterproof base provided with a recess, a center part formed of porous material provided with an integral projection to fit said recess and with a corrugated outer surface, and an integral upper glazed portion, the lower part of said glazed portion being provided with an annular outwardly projecting flange, a cap piece supported upon said flange, and a transparent jacket engaging the cap piece and the base in spaced relation to the center part.

3. A flower vase comprising a waterproof base provided with a centrally located recess, a center part formed of porous material provided with a centrally located integral projection to fit said recess whereby said center part may be revolvably supported on said base, said center part having a corrugated outer surface, and an integral upper glazed portion, the lower part of said glazed portion being provided with an annular outwardly projecting flange.

4. A flower vase comprising a waterproof base provided with a recess, a center part formed of porous material provided with an integral projection to fit said recess and with a corrugated outer surface, and an integral upper glazed portion, the lower part of said glazed portion being provided with an annular outwardly projecting flange, a cap piece supported upon said flange, and a transparent jacket engaging the cap piece and the base in spaced relation to the center part; irrigating means between said cap and said flange, and an indirect irrigating space formed by said upper glazed portion and said cap.

5. A flower vase comprising a base, a center part formed of porous material with a corrugated outer surface, and an integral upper glazed portion, the lower part of said glazed portion being provided with an annularly outwardly projecting flange, a cap piece supported upon said flange, irrigating means between said cap piece and said flange, said base having an inner drain and an outer trough, a transparent jacket engaging the cap piece and the trough in spaced relation to the center part, and means at the top and bottom of the vase for ventilating the space between the jacket and center part.

6. A flower vase comprising a base, a center part formed of porous material with a corrugated outer surface, and an integral upper glazed portion, the lower part of said glazed portion being provided with an annular outwardly projecting flange, a cap piece supported upon said flange, irrigating means between said cap piece and said flange, said base having an inner drain and an outer trough, a transparent jacket engaging the cap piece and the trough in spaced relation to the center part, and means at the top and bottom of the vase for ventilating the space between the jacket and the center part, such ventilating means comprising crimped portions at the top and bottom of said jacket.

7. A flower vase comprising a base, a center part formed of porous material with a corrugated outer surface, and an integral upper glazed portion, the lower part of said glazed portion being provided with an annular outwardly projecting flange, a cap piece supported upon said flange, irrigating means between said cap piece and said flange, said base having an inner drain and an outer trough, a transparent jacket engaging the cap piece and the trough in spaced relation to the center part, and means at the top and bottom of the vase for ventilating the space between the jacket and center part, such ventilating means comprising a circumferential series of flutes on the outer surface of the cap piece and the inner side of the outer trough.

In testimony whereof I affix my signature.

PAUL W. LEFFLAND.